(12) United States Patent
Yamanaka et al.

(10) Patent No.: US 10,675,604 B2
(45) Date of Patent: Jun. 9, 2020

(54) EUTECTIC COLLOIDAL CRYSTAL, EUTECTIC COLLOIDAL CRYSTAL SOLIDIFIED BODY, AND METHODS FOR PRODUCING THEM

(71) Applicant: PUBLIC UNIVERSITY CORPORATION NAGOYA CITY UNIVERSITY, Nagoya-shi, Aichi (JP)

(72) Inventors: Junpei Yamanaka, Nagoya (JP); Akiko Toyotama, Nagoya (JP); Tohru Okuzono, Nagoya (JP); Satoshi Uda, Sendai (JP); Jun Nozawa, Sendai (JP)

(73) Assignee: PUBLIC UNIVERSITY CORPORATION NAGOYA CITY UNIVERSITY, Nagoya-shi (JP)

(*) Notice: Subject to any disclaimer, the term of this patent is extended or adjusted under 35 U.S.C. 154(b) by 4 days.

(21) Appl. No.: 15/534,932

(22) PCT Filed: Dec. 2, 2015

(86) PCT No.: PCT/JP2015/083862
§ 371 (c)(1),
(2) Date: Jun. 9, 2017

(87) PCT Pub. No.: WO2016/093121
PCT Pub. Date: Jun. 16, 2016

(65) Prior Publication Data
US 2017/0361297 A1    Dec. 21, 2017

(30) Foreign Application Priority Data

Dec. 12, 2014  (JP) .................. 2014-252527

(51) Int. Cl.
*B01J 13/00* (2006.01)
*C08L 25/06* (2006.01)
*C08F 257/02* (2006.01)

(52) U.S. Cl.
CPC ......... *B01J 13/0065* (2013.01); *C08F 257/02* (2013.01); *C08L 25/06* (2013.01);
(Continued)

(58) Field of Classification Search
CPC ... B01J 13/0065; C08L 25/06; C08L 2205/03; C08L 2205/025; C08L 2205/18; B32B 5/16
See application file for complete search history.

(56) References Cited

U.S. PATENT DOCUMENTS

| 6,756,115 B2 * | 6/2004 | Fu .............................. C09C 1/00 |
| | | 427/189 |
| 2004/0071965 A1 | 4/2004 | Fu et al. |
| 2012/0142860 A1 | 6/2012 | Yamanaka et al. |

FOREIGN PATENT DOCUMENTS

| JP | 2004-109178 A | 4/2004 |
| JP | 2004-514558 A | 5/2004 |
| WO | WO 2011/024709 A1 | 3/2011 |

OTHER PUBLICATIONS

Anna Kozina, Dominik Sagawe, Pedro Diaz-Leyva, Eckhard Bartsch and Thomas Palberg, Polymer-enforced crystallization of a eutectic binary hard sphere mixture, Soft Matter, 2012, 8, 627-630 (Year: 2012).*

(Continued)

*Primary Examiner* — Bijan Ahvazi
(74) *Attorney, Agent, or Firm* — Birch, Stewart, Kolasch & Birch, LLP

(57) ABSTRACT

[Object] Provided are a "eutectic colloidal crystal" which is an aggregate of plural kinds of colloidal crystals having different lattice constants, a solidified body of the eutectic colloidal crystal, and methods for producing them.

(Continued)

[Resolution means] The eutectic colloidal crystal of the present invention contains two or more kinds of colloidal crystals composed of substantially monodispersed colloidal particles having different particle sizes. This eutectic colloidal crystal is obtained by providing a colloidal dispersion of two or more kinds of colloidal particles having different particle sizes, and a polymer which will not substantially adsorb to the colloidal particles (the coefficient of variation in particle size of these colloidal particles is less than 20%) dissolved in a dispersion medium (dispersion preparation process), and allowing the colloidal dispersion to stand (eutectoid process).

16 Claims, 8 Drawing Sheets

(52) U.S. Cl.
CPC ..... *C08L 2205/025* (2013.01); *C08L 2205/03* (2013.01); *C08L 2205/18* (2013.01)

(56) References Cited

OTHER PUBLICATIONS

English Translation of the International Preliminary Report on Patentability(Forms PCT/IB/338 and PCT/IPEA/409), dated Jun. 15, 2017, for International Application No. PCT/JP2015/083862.

Gu Z-Z et al., "Fabrication of Colloidal Crystal Films", Journal of the Japan Society of Colour Material, vol. 76, No. 2, 2003, pp. 67-70.

International Preliminary Report on Patentability (PCT/IPEA/409 & PCT/IPEA/416) issued in PCT/JP2015/083862 completed Jul. 26, 2016.

International Search Report (PCT/ISA/210) issued in PCT/JP2015/083862, dated Feb. 9, 2016.

Kozina et al., "Crystallization Kinetics of Colloidal Binary Mixtures with Depletion Attraction", Soft Matter, vol. 10, 2014, pp. 9523-9533.

Park et al., "Depletion-Induced Shape and Size Selection of Gold Nanoparticles", Nano Letters, vol. 10, Issue 4, 2010, pp. 1433-1439.

Written Opinion (PCT/ISA/237) issued in PCT/JP2015/083862, dated Feb. 9, 2016.

* cited by examiner

[Fig. 1]
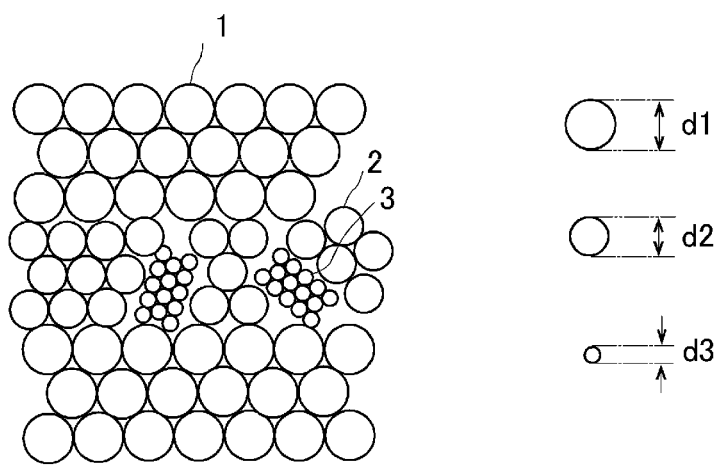

[Fig. 2]
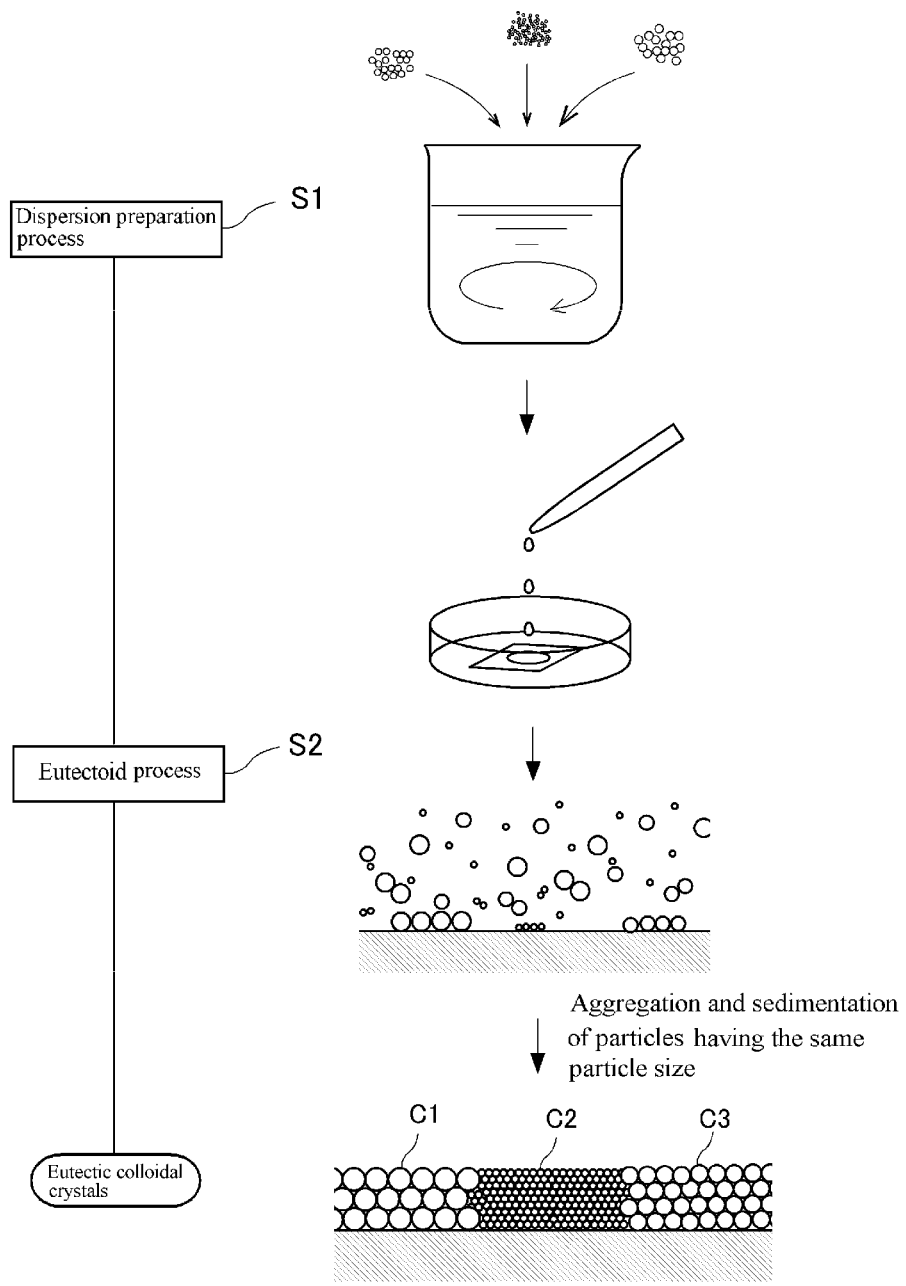

[Fig. 3]
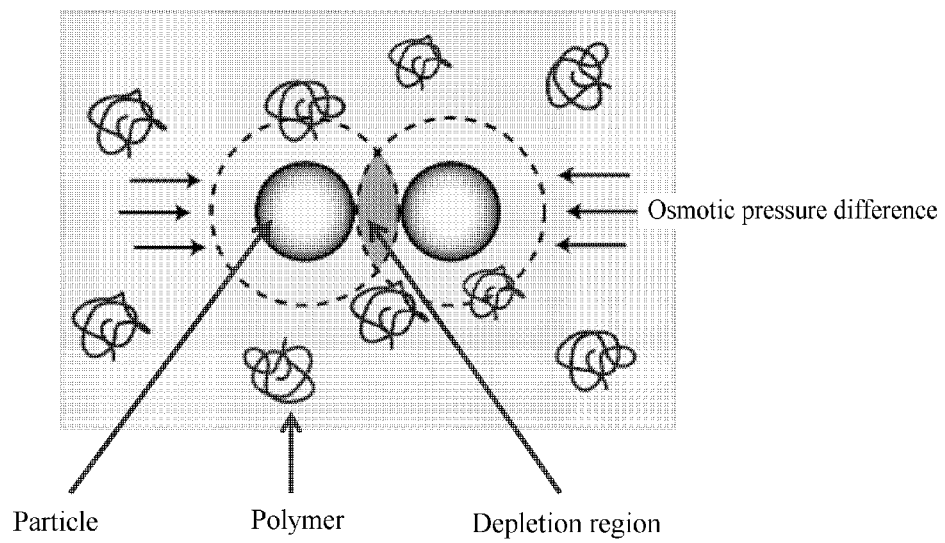
[Fig. 4]
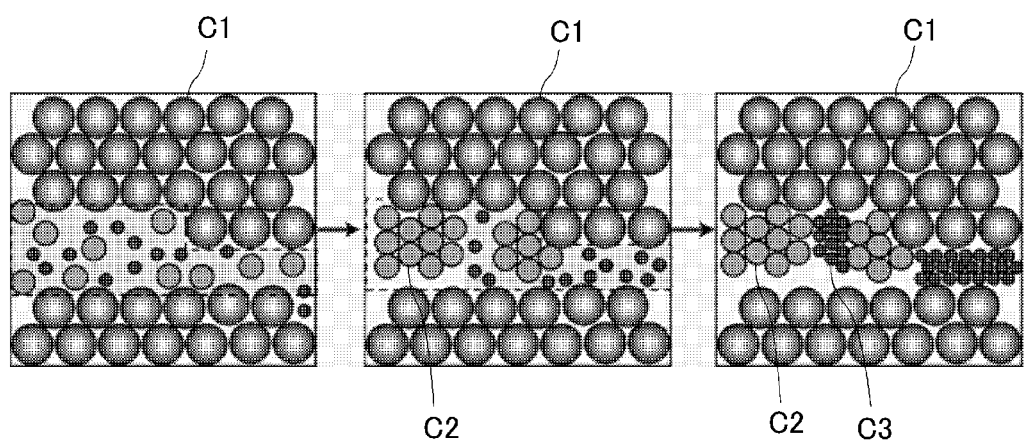

[Fig. 5]
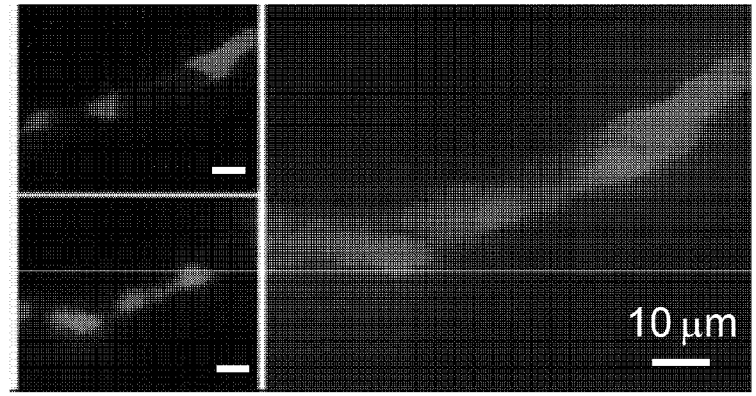
[Fig. 6]
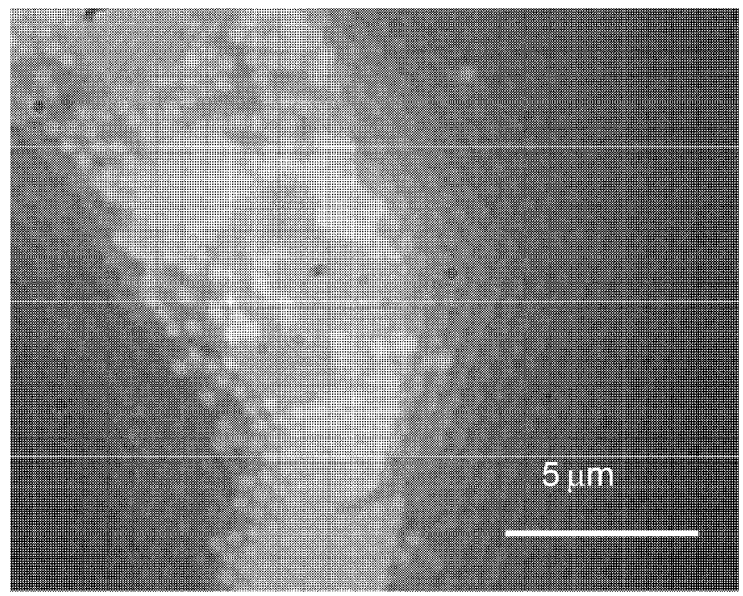
[Fig. 7]
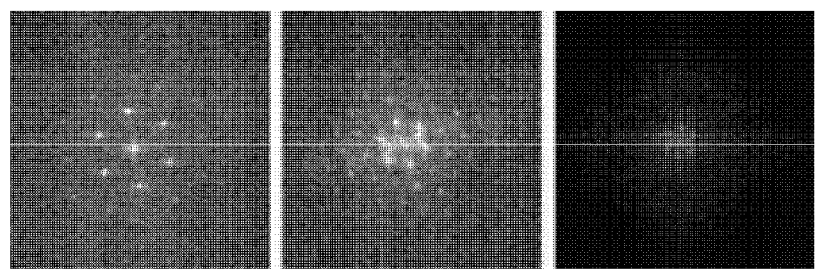

[Fig. 8]
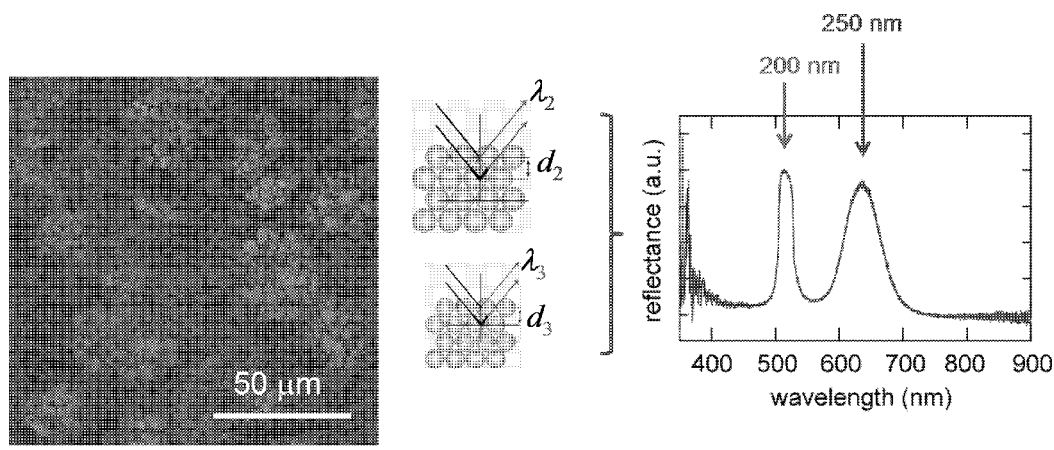
[Fig. 9]
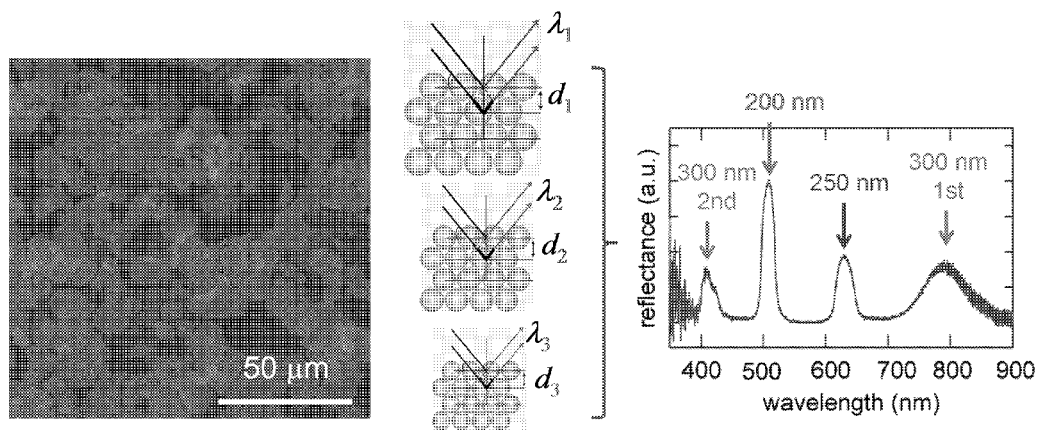

[Fig. 10]
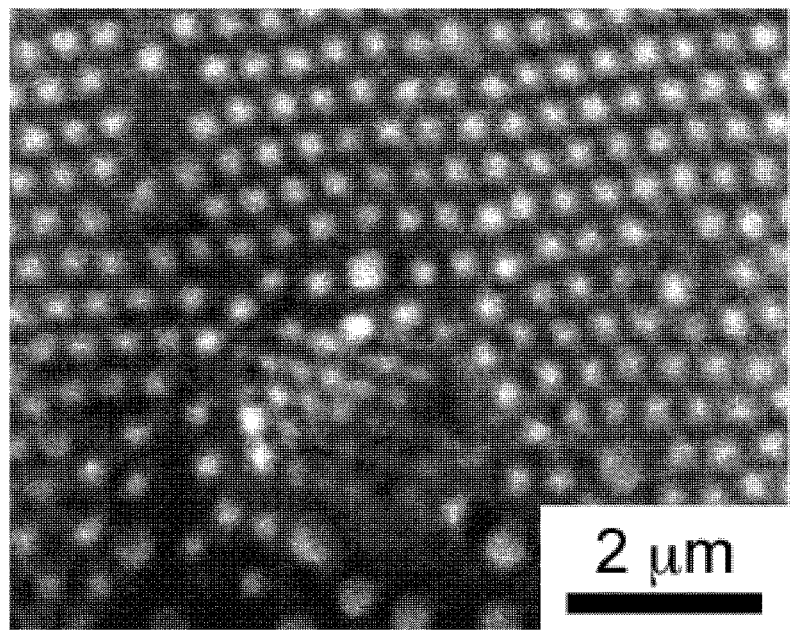
[Fig. 11]
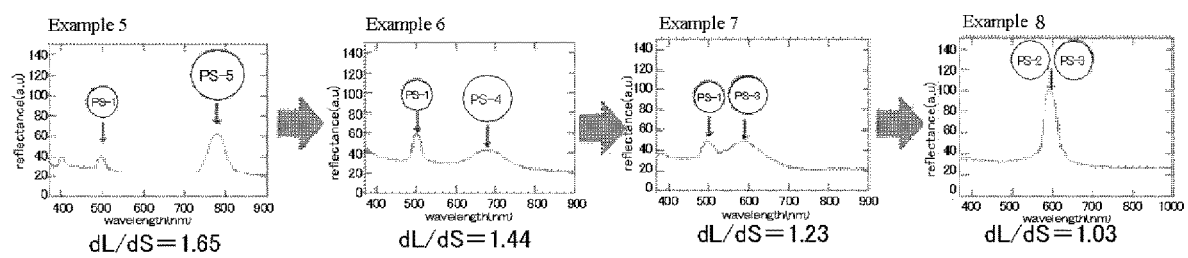

[Fig. 12]
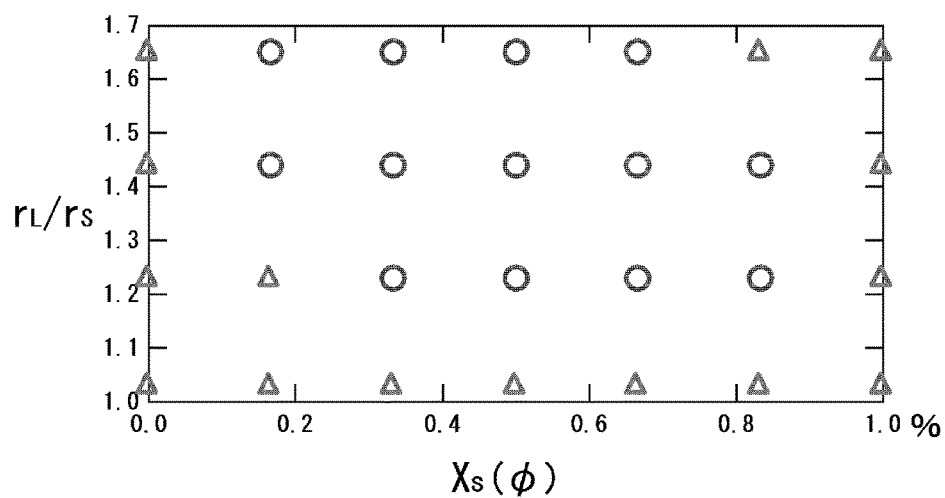
[Fig. 13]
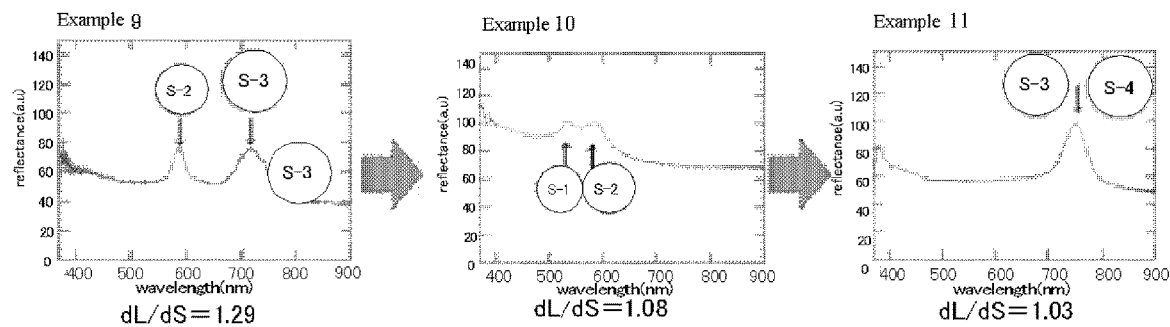

[Fig. 14]
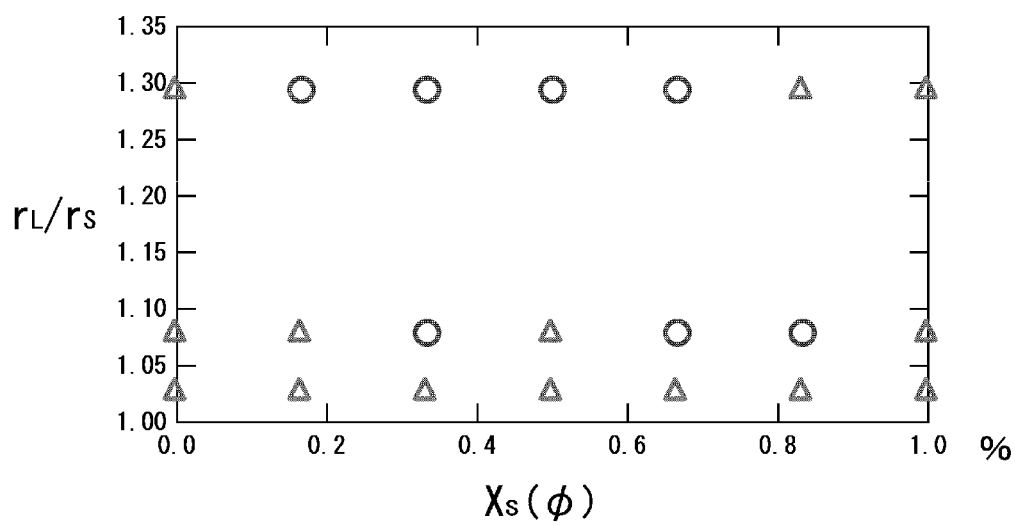
[Fig. 15]
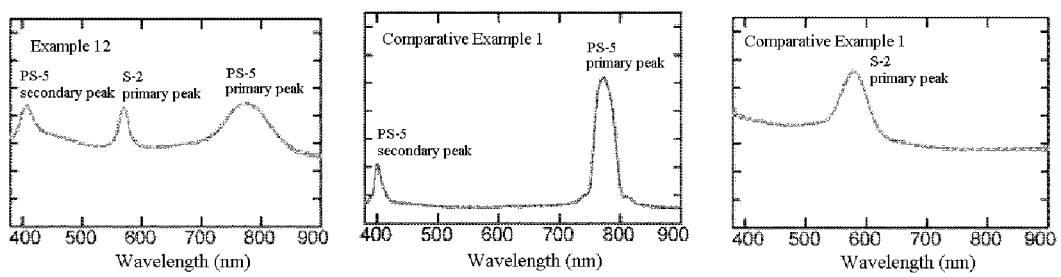

EUTECTIC COLLOIDAL CRYSTAL, EUTECTIC COLLOIDAL CRYSTAL SOLIDIFIED BODY, AND METHODS FOR PRODUCING THEM

TECHNICAL FIELD

The present invention relates to an aggregate of two or more kinds of opal-type colloidal crystals which are composed of monodispersed colloidal particles and mixed together at fixed positions (hereinafter referred to as "eutectic colloidal crystal" in this description), a solidified body of the eutectic colloidal crystal, and methods for producing them.

BACKGROUND ART

Colloid means a system in which disperse phases having a size of about several nm to several μm (e.g., colloidal particles) are dispersed in a dispersion medium. The colloidal particles in the colloid can be arranged regularly to form an orderly structure under special conditions, which is called colloidal crystals.

Similarly to usual crystals, the colloidal crystals Bragg-diffract electromagnetic waves according to the lattice spacing. The diffraction wavelength can be set to a visible light range by selecting production conditions (e.g., particle concentration, particle diameter, and refraction index of particles or medium). Therefore, application development to an optical element or the like including a photonic material has been actively studied both nationally and internationally. The present mainstream of a producing process of an optical material includes a multilayer thin film process and a lithography process. Both of the techniques can produce colloidal crystals having excellent periodic accuracy. However, the former provides only a one-dimensional periodic structure, and the latter provides only the one-dimensional periodic structure or a two-dimensional periodic structure.

There are three kinds of colloidal crystals.

The first type is the colloidal crystal in a hard sphere system on which only hard sphere repulsion works between particles. This colloidal crystallization depends only on entropy, and the particle concentration is the only one concrete parameter. This is similar to a phenomenon that macroscopic spheres are regularly arranged when they are stuffed into a limited space, and the volume fraction of the crystallized particles is about 0.5 (concentration=50% by volume) or more. At this time, crystallization occurs even if the particles are not in contact with each other.

The second type is the opal crystal, which is the generic name of a crystal structure packed with particles in contact with each other. The volume fraction depends on the crystal structure, and is, for example, about 0.68 for a body-centered cubic lattice, and 0.74 for a face-centered cubic lattice.

The third type is the charged colloidal crystal, which is formed by electrostatic interaction working between particles in a dispersion system of charged colloidal particles (charged colloidal system). The electrostatic interaction extends for a long distance, so that crystals can be formed even when the particle concentration is low (the interparticle distance is long), and the particle volume fraction is about 0.001.

There is a report that the colloidal particles having a uniform particle size precipitated, aggregated, and regularly arranged when they were used in a colloidal system with no special interaction between colloidal particles, and form closest-packed opal-type colloidal crystals (Patent Literature 1). However, for the opal-type colloidal crystals, only an aggregate composed of colloidal crystals having one lattice constant has been obtained, and there is no report on a eutectic colloidal crystal containing two or more kinds of colloidal crystals composed of monodispersed colloidal particles.

As an example of deposition of colloidal crystals from a multi-component colloid, Non-Patent Literature 1 reports the classification of gold fine particles and gold nano-rods, but the above-described eutectic colloidal crystal was not obtained therein. More specifically, this document reports that, from the mixed colloid of gold fine particles and gold nano-rods, only the gold fine particle alone formed colloidal crystals and gold nano-rods aggregated at the grain boundaries, which does not mean the formation of a eutectic colloidal crystal composed of the colloidal crystals of gold nano-rods and gold fine particles.

In a recently found phenomenon, plural kinds of opal-type colloidal crystals having different lattice constants coexisted in a dispersion medium (Non-Patent Literature 2). However, this colloidal crystal system is a state where plural kinds of opal-type colloidal crystals are suspended in a dispersion medium having the same specific gravity, but not mixed together at fixed positions to form an aggregate. Therefore, the direction of the optical axis of the colloidal crystals can be varied by Brownian movement, and thus the application to optical devices such as photonic materials is difficult.

CITATION LIST

Patent Literature

Patent Literature 1: Japanese Patent Application Laid-Open No. 2004-109178

Non-Patent Literatures

Non-Patent Literature 1: Kyoungweon P, et. al. Nanoletters 10, 1433-1439 (2010)
Non-Patent Literature 2: Anna Kozina, et. al. Soft Matter, 10, 9523-9533 (2014).

SUMMARY OF INVENTION

Technical Problems

The present invention has been accomplished in view of the above-described present circumstances, and is intended to provide a "eutectic colloidal crystal", which is an aggregate of two or more kinds of colloidal crystals which are composed of substantially monodispersed colloidal particles and mixed at fixed positions, a solidified body of the eutectic colloidal crystal, and methods for producing them.

Solutions to Problems

The inventors carried out the following study on the process of formation of colloidal crystals from colloidal particles dispersed in a colloid in the production of opal-type colloidal crystals.

When colloidal particles and a polymer, which will not adsorb to the colloidal particles, are dispersed in a dispersion medium, the colloidal particles approach each other to form narrow regions sandwiched between the colloidal particles. When the narrow regions are lessened to a degree that the polymer dispersed in the dispersion medium cannot enter, a polymer concentration difference arises between the narrow regions and other wider regions. This concentration difference causes an osmotic pressure difference, and thus an attraction works between the colloidal particles, and colloidal particles aggregate. For the cases of monodispersion where all the colloidal particles have a uniform particle size, closest-packed colloidal crystals having an equal lattice constant are formed. On the other hand, the particles contained in the monodispersed colloidal particles as impurities are ejected between the colloidal crystals without being taken into the colloidal crystals (e.g., see Non-Patent Literature 1)

The inventors further carried out a detailed study on the process of formation of colloidal crystals in the case where plural kinds of monodispersed colloidal particles having different particle sizes are mixed together in a colloid. As a result of this, a surprising eutectoid phenomenon was found; when the specific gravity of a dispersion medium is smaller than that of colloidal particles, among the plural kinds of colloidal particles, one kind of the colloidal particles becomes colloidal crystals, while the other kinds of the colloidal particles are ejected out to the region out of the colloidal crystals, and precipitate in the dispersion medium while forming other colloidal crystals having different lattice constants in the ejected region, and finally become an aggregate at the position where the plural colloidal crystals oriented on the bottom of the container are fixed (i.e., eutectic colloidal crystal), and thus the present invention has been accomplished.

More specifically, the eutectic colloidal crystal of the present invention contains two or more kinds of opal-type colloidal crystals composed of colloidal particles having a coefficient of particle size variation of less than 20%, the colloidal crystals being mixed together at fixed positions.

The eutectic colloidal crystal of the present invention contains two or more kinds of opal-type colloidal crystals composed of colloidal particles having a coefficient of particle size variation of less than 20%, the colloidal crystals being mixed together at fixed positions. In other words, opal-type colloidal crystals having different lattice constants are intermingled. Therefore, the diffraction color can be controlled by, for example, adjusting the combination and abundance ratio of these colloidal crystals. In addition, the eutectic colloidal crystal resists color fading because it is free of dyes, and thus is promising as a novel coloring material.

In addition, since the positions of the two or more kinds of opal-type colloidal crystals are fixed, the light axial direction of the plural colloidal crystals will not vary, different from the system described in Non-Patent Literature 2 where plural colloidal crystals are suspended in a dispersion medium. Therefore, the eutectic colloidal crystal is suitable for the use in optical devices such as photonic materials.

The coefficient of variation (CV) of the particle size means the value of (standard deviation of particle size×100/average particle size), and is preferably less than 15%, more preferably less than 12%, even more preferably less than 11%, yet more preferably less than 10%, and most preferably about 8% or less.

The eutectic colloidal crystal of the present invention can be produced as follows.

The method for producing the eutectic colloidal crystal of the present invention includes: a dispersion preparation process of preparing a colloidal dispersion where two or more kinds of colloidal particles having different particle sizes are dispersed in a dispersion medium which dissolves a polymer, the coefficient of variation of the particle size of the colloidal particles is less than 20%, and the specific gravity of the dispersion medium is smaller than that of the colloidal particles; and a eutectoid process of depositing two or more kinds of opal-type colloidal crystals having different lattice constants by allowing the colloidal dispersion to stand.

In this method for producing a eutectic colloidal crystal, firstly, as the dispersion preparation process, a colloidal dispersion is prepared in which two or more kinds of colloidal particles having different particle sizes are dispersed in a dispersion medium which dissolves a polymer, the coefficient of variation of the particle size of the colloidal particles is less than 20%, and the specific gravity of the dispersion medium is smaller than that of the colloidal particles. The proportion of the particle size between the colloidal particles having different particle sizes is preferably more than 1.03, more preferably 1.05 or more, and most preferably 1.1 or more. In addition, the total volume fraction of the colloidal particles to the dispersion is preferably from 0.001 to 0.1, and more preferably from 0.002 to 0.05.

Then, as the eutectoid process, the colloidal dispersion is allowed to stand. In this eutectoid process, of the plural kinds of colloidal particles, when one type of the colloidal particles becomes opal-type colloidal crystals, the other colloidal particles are ejected to the region out of the opal-type colloidal crystals, and form other opal-type colloidal crystals having a different lattice constant in the ejected region. The specific gravity of the dispersion medium is smaller than that of the colloidal particles, so that the plural opal-type colloidal crystals sediment in the dispersion medium while being formed, and finally become an aggregate of plural colloidal crystals (more specifically eutectic colloidal crystal), the lattice planes of the colloidal crystals being oriented on the bottom of the container.

The colloidal particles used for producing the eutectic colloidal crystal are not particularly limited, and may be organic or inorganic particles. The organic particles may be the particles of a polymer such as polystyrene or an acrylic resin (e.g., polyacrylate, polymethacrylate, or polyacrylonitrile). The inventors used the particles of polystyrene as the colloidal particles, and confirmed that eutectic colloidal crystal was certainly obtained. In addition, examples of the inorganic particles include silica, alumina, titanium oxide, gold, and silver.

According to the test results provided by the inventors, the particle size of the colloidal particles is preferably from 1 nm to 50 μm. If the particle size is less than 1 nm, sedimentation of the colloidal particles in the eutectoid process is too slow, and the production requires a long time. On the other hand, if the colloidal particles are larger than 50 μm, sedimentation is so fast that the crystals in the eutectic colloidal crystal tends to be disturbed. The particle size is particularly preferably from 10 nm to 1 μm. In order to adjust the sedimentation rate, the specific gravity of the dispersion medium is preferably selected as appropriate. The specific gravity of the dispersion medium can be adjusted by mixing with deuterium oxide or an organic solvent, and dissolving a low molecular solute therein.

The colloidal crystals of the present invention may be a eutectic colloidal crystal solidified body which has been solidified by an immobilizing agent. The eutectic colloidal crystal solidified body has a dramatically improved mechanical strength, and offers markedly easy handling.

A eutectic colloidal crystal solidified body is easily produced by using an immobilizing agent such as a photocurable resin. More specifically, the method of the present invention for producing a eutectic colloidal crystal solidified body includes: a dispersion preparation process of preparing a colloidal dispersion where two or more kinds of colloidal particles having different particle sizes are dispersed in a dispersion medium which dissolves a polymer and a photocurable resin, and the specific gravity of the dispersion medium is smaller than that of the colloidal particles; a eutectoid process of depositing two or more kinds of opal-type colloidal crystals having different lattice constants by allowing the colloidal dispersion to stand; and a photoirradiation process of immobilizing the eutectic colloidal crystal formed in the eutectoid process by photoirradiation.

Examples of the immobilizing agent include a solution containing a gel monomer, a crosslinking agent, and a photopolymerization initiator. Examples of the gel monomer include vinyl monomers such as acrylamide and derivatives thereof, examples of the crosslinking agent include N,N'-methylenebisacrylamide, and examples of the photopolymerization initiator include 2, 2'-azobis[2-methyl-N-[2-hydroxyethyl]-propionamide]. Other examples include a water soluble photosensitive resin composed of a polyvinyl alcohol with pendant azide photosensitive group. Alternatively, eutectic colloidal crystal are formed in a resin monomer, followed by solidification.

BRIEF DESCRIPTION OF DRAWINGS

FIG. 1 is a schematic view of a eutectic colloidal crystal of an embodiment.

FIG. 2 is a schematic view showing a production process of the eutectic colloidal crystal of the embodiment.

FIG. 3 is a schematic view showing a depletion effect in the case where colloidal particles are dispersed in a polymer solution.

FIG. 4 is a schematic view showing a formation process of the eutectic colloidal crystal.

FIG. 5 is an optical micrograph of the eutectic colloidal crystal of Example 1 (upper left: the case using a filter transmitting red color, lower left: the case using a filter transmitting green color, right: a photograph overlaying the upper left and lower left photographs).

FIG. 6 is an optical micrograph of the eutectic colloidal crystal of Example 1.

FIG. 7 shows Fourier transform image photographs of the crystal grains of the eutectic colloidal crystal of Example 1.

FIG. 8 shows an optical micrograph of the eutectic colloidal crystal of Example 2 (left), a schematic view showing diffraction in the particles (center), and a reflection spectrum (right).

FIG. 9 shows an optical micrograph of the eutectic colloidal crystal of Example 3 (left), a schematic view showing diffraction in the particles (middle), and a reflection spectrum (right).

FIG. 10 is an optical micrograph of the eutectic colloidal crystal fixed by the photocurable resin of Example 4.

FIG. 11 shows reflection spectra of the eutectic colloidal crystal in Examples 5 to 8.

FIG. 12 is a phase diagram of the eutectic colloidal crystal when four kinds of polystyrene colloidal particles (PS-1 to PS4) were used (the ordinate is the particle size ratio, and the abscissa is volume fraction (expressed in %)).

FIG. 13 shows reflection spectra of the eutectic colloidal crystal in Examples 9 to 11.

FIG. 14 is a phase diagram of the eutectic colloidal crystal when four kinds of silica colloidal particles (PS-1 to PS4) were used (the ordinate is the particle size ratio, and the abscissa is volume fraction (expressed in %)).

FIG. 15 shows reflection spectra in Example 12 and Comparative Examples 1 and 2.

DESCRIPTION OF EMBODIMENTS

FIG. 1 shows an example of the eutectic colloidal crystal of the present invention. The eutectic colloidal crystal is composed of three kinds of colloidal particles having different particle sizes d1, d2, and d3, wherein the colloidal crystals 1, colloidal crystals 2, and colloidal crystals 3, each composed of a single kind of colloidal particles, are intermingled. These colloidal crystals take a closest-packed structure. The lattice planes of the colloidal crystals are oriented so as to be in parallel to the paper plane.

The eutectic colloidal crystal can be produced according to the process shown in FIG. 2.

(Dispersion Preparation Process S1)

Firstly, as the dispersion preparation process S1, a solution of a polymer dissolved in a dispersion medium is prepared. Two or more kinds of monodispersed colloidal particles (three kinds in FIG. 2, but may be two, four, or more) having different particle sizes are added to the solution, and they are stirred to make a colloidal dispersion. Alternatively, each kind of the colloidal particles may be dispersed in advance in separate solvents to make dispersions. The dispersion medium is selected from those having a specific gravity smaller than that of the colloidal particles. In the preparation of the colloid, dispersion may be accelerated using an ultrasonic generator, which may be together with any other device. The dispersion medium is not particularly limited as long as it dissolves a polymer, and may be water or other organic solvent such as alcohol. The polymer is not particularly limited as long as it forms colloidal crystals, and may be an ionic polymer or a nonionic polymer.

Examples of the water-soluble nonionic polymer include polyethylene glycol, polypropylene glycol, polyvinyl alcohol, polyether, and polyvinyl pyrrolidone. Examples of the water-soluble ionic polymer include cationic polymers such as polyvinylpyridine, polyvinyl benzyl ammonium, and polypeptide; and anionic polymers such as polyacrylic acid, polyacrylamide, polypeptide, and natural polymers such as polysaccharides. In addition, examples of the hydrophobic polymer include polystyrene and polydimethylsiloxane (the solvent for them may be toluene or xylene).

In the selection of these polymers, the polymers having a charge opposite to that of the surface charge of the colloidal particles are not preferred, because they adsorb to colloidal particles to form a charged colloid. However, even the polymer having a charge opposite to that of the surface charge of the colloidal particles can be used by increasing the salt concentration, which markedly thins the electric double layer, allows the approach of the colloidal particles to each other, forms a hard sphere colloid, and finally, as will be described later, the difference in the polymer concentration causes the difference in the osmotic pressure to generate depletion attraction, and forms opal-type colloidal crystals. Furthermore, this phenomenon can be positively used to adjust the salt concentration in the colloid as appropriate to control the thickness of the electric double layer, which allows the control of, for example, the attraction between the colloidal particles, the growth rate of the opal-type colloidal crystals, and even the half width to the light of the colloidal crystals. Examples of the method for controlling the salt concentration include the control of the abundance of ionic groups (carboxylates, amino groups, etc.) in polymers, and addition of salts.

Alternatively, the eutectic colloidal crystal may be produced by adding, in addition to the colloidal particles forming opal-type colloidal crystals, the particles finer than the colloidal particles as a polymer, and making the added particles exert the below-described depletion attraction.

(Eutectoid Process S2)

In the next place, colloidal dispersion prepared in the dispersion preparation process S1 is taken by a dropper or the like, placed on a glass bottom dish or the like, and allowed to stand (eutectoid process S2). In the eutectoid process S2, the colloidal particles having the same particle size attract each other to flocculate, and a eutectic colloidal crystal composed of three or more kinds of colloidal crystals C1, C2, and C3 having different lattice constants is formed.

The reason for the attraction of the colloidal particles is presumed as follows. More specifically, the polymer added to the colloidal dispersion is dissolved in the dispersion medium, and intrinsically dispersed in the dispersion medium uniformly. However, as shown in FIG. 3, narrow regions which are too small for the entry of the polymer are formed when the colloidal particles have approached each other. Therefore, the narrow regions become depletion regions where no polymer is present, and a polymer concentration difference arises between the narrow regions and other bulk regions. Because of the osmotic pressure difference, the colloidal particles approach and contact with each other, and form colloidal crystals. Accordingly, when the added polymer adsorbs to the colloidal particles, such depletion regions are unlikely to be formed, and the osmotic pressure difference is unlikely to occur, which is not preferred for the production of colloidal crystals.

In the formation process of the eutectic structure of the colloidal particles, a behavior similar to eutectic formation in the atomic and molecular system is observed. More specifically, the approach between the colloidal particles is made between the particles having the same particle size to form the first colloidal crystals C1, and the colloidal particles having the other particle size gather at the grain boundaries of the first colloidal crystals (left of FIG. 4). In this manner, among the colloidal particles gathered at the grain boundaries of the first colloidal crystals C1, the colloidal particles having the same particle size further gather to form the second colloidal crystals C2 (middle of FIG. 4). Furthermore, the colloidal particles gathered at the grain boundaries of the first and second colloidal crystals C1 and C2 form the third colloidal crystals C3 (right of FIG. 4).

During the formation of the colloidal crystals C1, C2, and C3, the colloidal crystals C1, C2, and C3 composed of the colloidal particles having a higher specific gravity than the dispersion medium keep on sedimentation. And finally they precipitate on the bottom of the container, and form an aggregate (more specifically, eutectic colloidal crystal) at the positions where the colloidal crystals C1, C2, and C3 are fixed. At this time, the colloidal crystals are oriented on the bottom.

Examples further embodying the present invention are described below.

EXAMPLE 1

In Example 1, a eutectic colloidal crystal was made using three kinds of monodispersed polystyrene particles. More specifically, the first polystyrene particles were spherical charged polystyrene particles PS600 (Thermo Scientific, purchased in the form of an aqueous dispersion with diameter d=600 nm and volume fraction=0.05, coefficient of variation in particle size: 3%), the second polystyrene particles were spherical green fluorescent charged polystyrene particles G500 (commercial product, diameter d=500 nm, volume fraction=0.1, coefficient of variation in particle size: 5%), and the third polystyrene particles were spherical red fluorescent charged polystyrene particles DR390 (commercial product, diameter d=about 390 nm, volume fraction=0.01, coefficient of variation in particle size: 5%). These particles were purified by a dialysis method and an ion exchange method, mixed at the ratio of the first polystyrene particles:second polystyrene particles:third polystyrene particles=1:0.1:0.05 (volume ratio) (200 µL in total), further 200 µL of a 0.1 w % sodium polyacrylate PAANa (molecular weight: one million, degree of neutralization: 50%) aqueous solution was added, and stirred to make a hard sphere colloid sample. 400 µL of the hard sphere colloid sample was placed in a glass bottom dish container, allowed to stand for several hours to one week, and observed with an inverted optical microscope. The results are shown in FIGS. 5 and 6. The upper left of FIG. 5 is the photograph of the case using a filter transmitting red color, the lower left is the photograph of the case using a filter transmitting green color, and the right is the photograph showing the case using no filter. These photographs show that the first to third polystyrene particles aggregated separately. In addition, FIG. 6 shows that the aggregated first to third polystyrene particles took on a closest-packed structure to form a eutectic colloidal crystal, which is an aggregate of colloidal crystals.

Furthermore, as shown in FIG. 7, the Fourier transform images of the crystal grains show that the colloidal particles grow in the crystal structures to form a mixture of three kinds of colloidal crystals (more specifically eutectic colloidal crystal), and all of these colloidal crystals are oriented on the bottom of the container.

EXAMPLE 2

In Example 2, a eutectic colloidal crystal was made using two kinds of monodispersed polystyrene particles. More specifically, the first polystyrene particles were spherical charged polystyrene particles PS200 (Thermo Scientific, diameter d=200 nm, volume fraction=0.1, coefficient of variation in particle size: 5%), and the second polystyrene particles were spherical charged polystyrene particles PS250 (synthesized by the inventors, diameter d=250 nm, volume fraction=0.068, coefficient of variation in particle size: 15%).

The polystyrene particles were synthesized by a soap free emulsion polymerization method. More specifically, 210 mL of water, 100 mL of methanol, 20 mL of styrene monomer, 0.15 g of sodium p-styrenesulfonate as an anionic comonomer, and 1 mL of divinylbenzene were mixed, and stirred for about 30 minutes in a constant temperature bath at 80° C., at a rotation speed of 300 rpm, and in an argon atmosphere. Thereafter, 0.1 g of potassium peroxodisulfate as a radical polymerization initiator was added and stirred for 7 hours, thus synthesizing polystyrene particles.

These particles were purified by a dialysis method and an ion exchange method, mixed at a ratio of the first polystyrene particles:second polystyrene particles=25:1 (volume ratio) (75 µL in total), further 200 µL of sodium polyacrylate PAANa (molecular weight:million, degree of neutralization: 50%, 0.1 w % aqueous solution) was added, and stirred to make a colloid sample. The procedure thereafter is the same as that in Example 1, so that the explanation thereof is omitted.

The precipitate formed on the glass bottom dish as described above were subjected to optical microphotographing and reflection spectrum measurement (fiber spectrometer, Ocean Optics, USB2000). The results are shown in FIG. 8. The microphotograph shown at the left of FIG. 8 indicates that, of the two kinds of particles, the particles having the same particle size were gathered. In addition, in the reflection spectrum on the right side, a reflection spectrum at 510 nm generated by closest-packing of 200 nm particles, and a reflection spectrum at 630 nm generated by closest-packing of 250 nm particles were observed, which indicates that closest-packed colloidal crystals had been formed.

EXAMPLE 3

In Example 3, a eutectic colloidal crystal was made using three kinds of monodispersed polystyrene particles. More specifically, the first polystyrene particles were spherical charged polystyrene particles PS200 (Thermo Scientific, diameter d=200 nm, volume fraction=0.1), the second polystyrene particles were spherical charged polystyrene particles PS250 (synthesized by the inventors (the particles used in Example 2), diameter d=250 nm, volume fraction=0.068), and the third polystyrene particles were spherical charged polystyrene particles PS300 (Thermo Scientific, diameter d=about 300 nm, volume fraction=0.1, coefficient of variation in particle size: 3%). These particles were purified by a dialysis method and an ion exchange method, mixed at the ratio of the first polystyrene particles:second polystyrene particles:third polystyrene particles=4:3:5 (volume ratio) (100 μL in total), further 200 μL of a 0.1 w % sodium polyacrylate PAANa (molecular weight:one million, degree of neutralization 50%) aqueous solution was added, and stirred to make a colloidal dispersion. The procedure thereafter is the same as that in Example 1, so that the explanation thereof is omitted.

The precipitate formed on the glass bottom dish as described above were subjected to optical microphotographing and reflection spectrum measurement (fiber spectrometer, Ocean Optics, USB2000). The results are shown in FIG. 9. The microphotograph shown at the left of FIG. 9 indicates that, of the three kinds of particles, the particles having the same particle size were gathered together. In addition, in the reflection spectrum on the right side, a reflection spectrum at 510 nm generated by closest-packing of 200 nm particles, a reflection spectrum at 630 nm generated by closest-packing of 250 nm particles, and a reflection spectrum at 790 nm generated by closest-packing of 300 nm particles were observed, and further a reflection spectrum appeared at 410 nm, which is presumed to be a secondary diffraction line of the colloidal crystals of 300 nm particles.

EXAMPLE 4

<Preparation of Eutectic Colloidal Crystal Solidified Body>

In Example 4, the eutectic colloidal crystal was fixed by photocurable hydrogel using two kinds of monodispersed polystyrene particles.

More specifically, spherical charge polystyrene particle PS600 (Thermo Scientific, diameter d=200 nm, volume fraction=0.1) as the first polystyrene particles, and spherical charge polystyrene particle PS430 (synthesized by the inventors (the particles used in Example 2, diameter d=430 nm, volume fraction=0.068) as the second polystyrene particles were purified by a dialysis method and an ion exchange method, mixed at the ratio of the first polystyrene particles:second polystyrene particles=5:1 (volume ratio) (50 μL in total), further 200 μL of a 0.1 wt % aqueous solution of sodium polyacrylate PAANa (molecular weight: one million, degree of neutralization 50%), 250 μL of the following gelling agent, and 500 μL of water were added and stirred to make a colloidal dispersion. The procedure thereafter is the same as that in Example 1; after confirming the formation of the eutectic colloidal crystal by an optical microscope, polymerization of the gelling agent was initiated by ultraviolet irradiation, whereby a eutectic colloidal crystal solidified body was obtained.

Composition of Gelling Agent

Gel monomer: N,N'-dimethylol acrylamide (N-MAM) 0.67 mol/L

Crosslinking agent: methylenebisacrylamide (BIS) 10 mmol/L

Photopolymerization initiator:

2,2'-azobis[2-methyl-N-[2-hydroxyethyl]-propionamide 4 mg/mL

As a result of this, as shown in FIG. 10, it was found that two kinds of colloidal crystals having different lattice constants were maintained in a state firmly fixed by the gelling agent.

<Influence of Particle Size on Formation of Eutectic Colloidal Crystal>

In order to determine how much difference in colloidal particle size is necessary for the formation of a eutectic colloidal crystal in the production of a eutectic colloidal crystal composed of different two kinds of monodispersed colloidal particles, the following experiment was carried out using the colloidal particles of various particle sizes.

More specifically, the polystyrene (PS) particles (Thermo Scientific and others, PS-1 to PS-5) and silica particles (Nippon Shokubai Co., Ltd, S-1 to S-4) having various particle sizes shown in Table 1 were used, and sodium polyacrylate (NaPAA), which had been prepared by adding NaOH to polyacrylic acid (Wako Pure Chemical Industries, Ltd.) to make a sample with a degree of neutralization of 50%, was used as a polymer. In addition, two kinds of colloidal particles dispersions and 0.1 wt % NaPAA were mixed so as to make the total concentration of the two kinds of colloidal particles 3.0 vol %, thus producing a eutectic colloidal crystal. Table 1 shows the particle size d (nm) and the number of surface charges Z (count/particle) of the colloidal particles. Table 2 shows the combination of the two-component colloidal systems and the ratio of the particle size of the two kinds of colloidal particles used in the experiment.

TABLE 1

| Polystyrene | PS-1 | PS-2 | PS-3 | PS-4 | PS-5 |
|---|---|---|---|---|---|
| d (nm) | 171 | 205 | 211 | 247 | 282 |
| Z (/particles) | 561 | 649 | 767 | 745 | 1302 |

| Silica | S-1 | S-2 | S-3 | S-4 |
|---|---|---|---|---|
| d (nm) | 189 | 204 | 264 | 271 |
| Z (/particles) | 719 | 608 | 1422 | 1361 |

TABLE 2

|  | Large particles (L) | Small particles (S) | Particle size of (L)/particle size of (S) |
|---|---|---|---|
| Example 5 | PS-5 | PS-1 | 1.65 |
| Example 6 | PS-4 | PS-1 | 1.44 |
| Example 7 | PS-3 | PS-1 | 1.23 |
| Example 8 | PS-3 | PS-2 | 1.03 |
| Example 9 | S-3 | S-2 | 1.29 |
| Example 10 | S-2 | S-1 | 1.08 |
| Example 11 | S-4 | S-3 | 1.03 |

The Case Using Polystyrene Particles as Colloidal Particles

The reflection spectrum was measured two to four days after the preparation of the eutectic colloidal crystal. As a result of this, in Examples 5 to 8 where polystyrene particles were used as colloidal particles, as shown in FIG. 11, except for Example 8 where the particle size ratio was as small as 1.03, two diffraction peaks were clearly observed, which indicates the formation of a eutectic colloidal crystal. On the other hand, in Example 8, a single diffraction peak was observed. The reason for this is likely that a eutectic colloidal crystal having adjacent diffraction wavelengths was formed, or a solid solution was formed because the particle size ratio was as small as 1.03.

(Drawing of Phase Diagram)

Using the four kinds of polystyrene colloidal particles (PS-1 to PS-4) shown in Table 1, colloidal dispersions were prepared at various particle size ratios ($r_L/r_S$) and various volume fractions, and allowed to stand. Thereafter, the reflection spectra of the precipitates were measured, and the presence or absence of the generation of colloidal crystals was examined, thereby drawing a phase diagram. The result is shown in FIG. 12. The marks ○ show the conditions under which two diffraction peaks were observed in the reflection spectrum measurement (more specifically, the conditions under which a eutectic colloidal crystal was observed), and the marks Δ show the conditions under which a single diffraction peak was observed in the reflection spectrum measurement (more specifically, the conditions under which no eutectic colloidal crystal was observed).

The Case Using Silica Particles as Colloidal Particles

The reflection spectrum was measured two to four days after the preparation of the eutectic colloidal crystal. As a result of this, in Examples 9 to 11 where silica particles were used as colloidal particles, as shown in FIG. 13, except for Example 11 where the particle size ratio was as small as 1.03, two diffraction peaks were clearly observed, which indicates that a eutectic colloidal crystal was formed. On the other hand, in Example 11, a single diffraction peak was observed. The reason for this is likely that a eutectic colloidal crystal having adjacent diffraction wavelengths was formed, or a solid solution was formed because the particle size ratio was as small as 1.03.

(Drawing of Phase Diagram)

Using the four kinds of silica colloidal particles (S-1 to S-4) shown in Table 1, colloidal dispersions were prepared at various particle size ratios ($r_L/r_S$) and various volume fractions, and allowed to stand. Thereafter, the reflection spectra of the precipitates were measured, and the presence or absence of the generation of colloidal crystals was examined, thereby drawing a phase diagram. The result is shown in FIG. 14. The meanings of the marks ○ and Δ are the same as the case using polystyrene colloidal particles.

<Formation of Eutectic Colloidal Crystal Composed of Polystyrene Particles and Silica Particles>

In Example 12, polystyrene colloidal particles PS-5 (2.5 vol %) and silica colloidal particles S-2 (:0.5 vol %) were mixed to make a colloidal dispersion, and this dispersion was allowed to stand to prepare a eutectic colloidal crystal composed of polystyrene colloidal crystals and silica colloidal crystals.

On the other hand, in Comparative Example 1, a colloidal dispersion was prepared from polystyrene colloidal particles PS-5 (3 vol %) alone, and the dispersion was allowed to stand to prepare polystyrene colloidal crystals.

In Comparative Example 2, a colloidal dispersion composed of silica colloidal particles S-2 (3.0 vol %) alone was prepared, and allowed to stand to prepare silica colloidal crystal.

The eutectic colloidal crystal of Example 12 and the colloidal crystals of Comparative Examples 1 and 2 thus prepared were measured for the reflection spectra 2 to 4 days after preparation.

As a result of this, as shown in FIG. 15, in Example 12 where the crystals were prepared from the polystyrene colloidal particles PS-5 and silica colloidal particles S-2, the primary and secondary peaks of the polystyrene colloidal crystals, and the primary peak of the silica colloidal crystals were observed. On the other hand, the primary and secondary peaks of the polystyrene colloidal crystals were observed in Comparative Example 1, and the primary peak of the silica colloidal crystals was observed in Comparative Example 2.

According to these results, it was found that a eutectic colloidal crystal was obtained even by mixing colloidal particles of different components, or silica colloidal particles and polystyrene colloidal particles.

The present invention is not limited to the description of the examples of the invention in any way. The present invention includes various modification aspects capable of being easily conceived by a person skilled in the art without departing from the description of claims.

INDUSTRIAL APPLICABILITY

The eutectic colloidal crystal of the present invention is useful as a model system of atomic and molecular crystals, and as a technical tool of research and development in the field of crystallography. In particular, since the particles of colloidal crystals can be observed by optical microscopes, they are easier to be observed than atomic and molecular crystals. In addition, since many kinds of colloidal crystals are intermingled, for example, the adjustment of the abundance ratio between them allows the control of the diffraction color. In addition, it is resistant to color fading, and thus is promising as a novel coloring material which develops mixed colors of three primary colors. In addition, it can be used as an electron material for optical filters, or as a decoration material for smartphone covers and nail materials.

REFERENCE SIGNS LIST 1, 2, 3 colloidal crystals (eutectic colloidal crystal)

The invention claimed is:

1. A eutectic colloidal crystal comprising two or more kinds of opal-type colloidal crystals, each said two or more kinds of opal-type colloidal crystals being composed of different types of colloidal particles, each type of the colloidal particles having a different particle size and having a coefficient of particle size variation of less than 20% the colloidal particles being mixed together at fixed positions in the eutectic colloidal crystal, wherein the coefficient of particle size variation is a value of a standard deviation of particle diameter×100/an average particle diameter.

2. The eutectic colloidal crystal of claim 1, wherein the lattice planes of the two or more kinds of opal-type colloidal crystals are oriented on the same plane.

3. The eutectic colloidal crystal of claim 1, wherein the two or more kinds of opal-type colloidal crystals are composed of polymer colloidal particles.

4. The eutectic colloidal crystal of claim 3, wherein the polymer colloidal particles are composed of polystyrene particles.

5. The eutectic colloidal crystal of claim 1, wherein the average particle size of each type of the colloidal particles is from 1 nm to 50 μm.

6. The eutectic colloidal crystal of claim 1, wherein the two or more kinds of opal-type colloidal crystals are composed of silica particles.

7. A eutectic colloidal crystal solidified body prepared by immobilizing the eutectic colloidal crystal of claim 1 by an immobilizing agent.

8. The eutectic colloidal crystal of claim 1, wherein said two or more kinds of opal-type colloidal crystals have different lattice constants from each other.

9. The eutectic colloidal crystal of claim 1, wherein said two or more kinds of opal-type colloidal crystals are composed of polystyrene particles, and said two or more kinds of opal-type colloidal crystals have different lattice constants from each other.

10. A method for producing eutectic colloidal crystal comprising:

a dispersion preparation process of preparing a colloidal dispersion where two or more kinds of opal-type colloidal crystals, each said two or more kinds of opal-type colloidal crystals being composed of different types of colloidal particles, each type of the colloidal particles having a different particle size are dispersed in a dispersion medium which dissolves a polymer, the coefficient of variation of the particle size of the colloidal particles is less than 20% the colloidal particles being mixed together at fixed positions in the eutectic colloidal crystal, and the specific gravity of the dispersion medium is smaller than that of the colloidal particles; and a eutectoid process of depositing the two or more kinds of opal-type colloidal crystals having different lattice constants by allowing the colloidal dispersion to stand.

11. The method for producing the eutectic colloidal crystal of claim 10, wherein the two or more kinds of opal-type colloidal crystals are composed of polymer colloidal particles.

12. The method for producing the eutectic colloidal crystal of claim 10, wherein the polymer colloidal particles are composed of polystyrene particles.

13. The method for producing the eutectic colloidal crystal of claim 10, wherein the two or more kinds of opal-type colloidal crystals are composed of silica particles.

14. The method for producing the eutectic colloidal crystal of claim 10, wherein the average particle size of each type of the colloidal particles is from 1 nm to 50 μm.

15. The method for producing the eutectic colloidal crystal of claim 10, wherein the volume fraction of the colloidal particles to the colloidal dispersion is from 0.001 to 0.1.

16. A method for producing a eutectic colloidal crystal solidified body comprising:

a dispersion preparation process of preparing a colloidal dispersion where two or more kinds of opal-type colloidal crystals, each said two or more kinds of opal-type colloidal crystals being composed of different types of colloidal particles, each type of the colloidal particles having a different particle size are dispersed in a dispersion medium which dissolves a polymer and a photocurable resin, the colloidal particles being mixed together at fixed positions in the eutectic colloidal crystal, the coefficient of variation of the particle size of the colloidal particles is less than 20% and the specific gravity of the dispersion medium is smaller than that of the colloidal particles;

a eutectoid process of depositing the two or more kinds of opal-type colloidal crystals having different lattice constants by allowing the colloidal dispersion to stand; and a photoirradiation process of immobilizing the eutectic colloidal crystal formed in the eutectoid process by photoirradiation.

* * * * *